Nov. 9, 1926.
W. S. WESTON
GYRATORY CRUSHING MACHINE
Filed Nov. 22, 1923
1,606,114
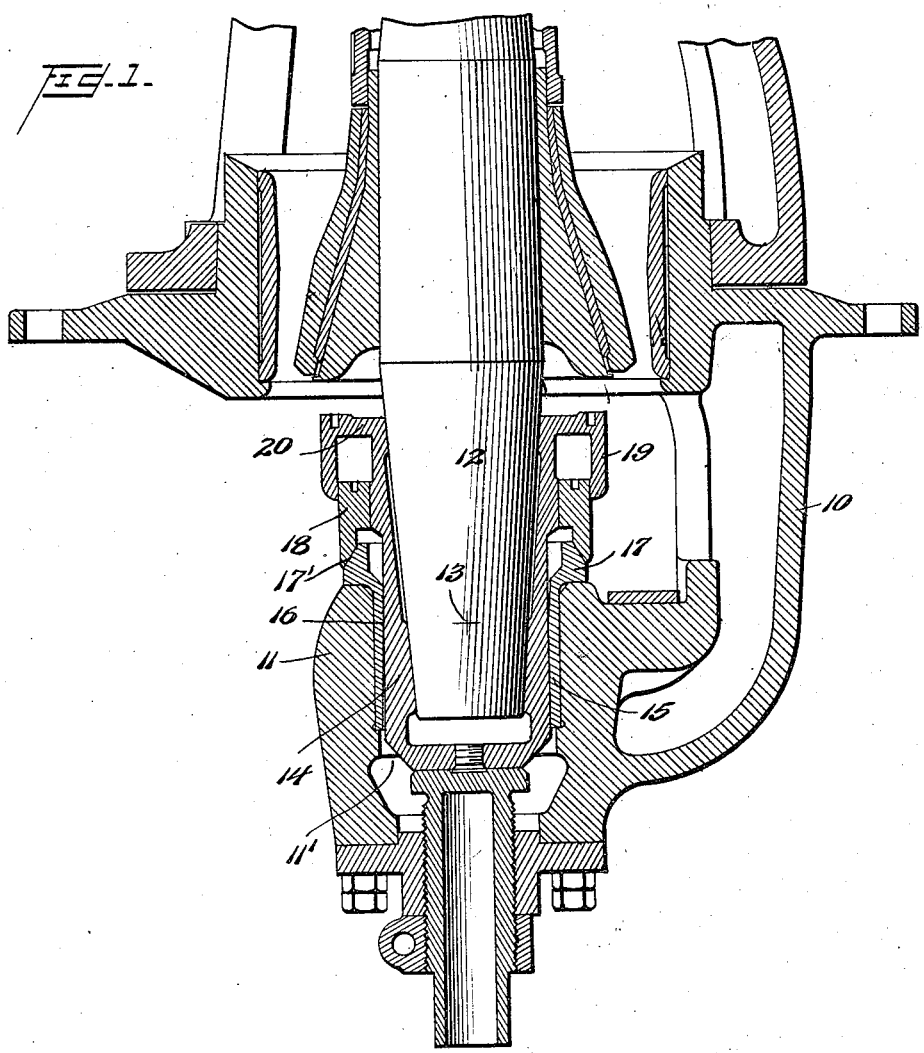
Inventor
William S. Weston,
By Watson, Coit, Morse
& Grindle
Attorney Patented Nov. 9, 1926.

1,606,114

UNITED STATES PATENT OFFICE.

WILLIAM S. WESTON, OF COLUMBIA, SOUTH CAROLINA.

GYRATORY CRUSHING MACHINE.

Application filed November 22, 1923. Serial No. 676,421.

The present invention relates to gyratory crushing machines and particularly to dust collar constructions for such machines.

In my copending application Serial No. 575,861, filed July 18, 1922, is disclosed and claimed a novel dust collar construction for gyratory crushing machines whereby dust and grit is prevented from entering the socket formed in the frame of the machine to receive and retain the lower end of the gyratory shaft. The present invention constitutes an improvement upon that disclosed in my prior application, or rather it provides a modified form of my prior invention which may be preferable in certain instances. In the present construction one joint through which dust and grit may find access to the socket is eliminated and the elimination of this joint is particularly important where water flows through the crusher while in operation.

One form of the invention will be described in detail which form is illustrated in the accompanying drawings. In the drawings:

Fig. 1 is an axial section through the lower portion of a gyratory crushing machine having the improved means for excluding dust from the shaft socket incorporated therein; and Fig. 2 is a section through a small portion of the dust excluding means on a larger scale.

The lower portion of the frame is indicated at 10 and this portion of the frame includes a hub 11 having a socket 11' into which the lower end of the gyratory shaft 12 extends, the shaft being constrained to gyrate about a point 13. The sleeve 14 is interiorly tapered to receive the corresponding exteriorly tapered lower end of the shaft, this sleeve comprising a member for taking the wear due to the gyratory movement of the shaft. The cylindrical outer surface of the sleeve is adapted to engage the inner wall of a bushing 15 which makes a tight fit with the socket wall. The bushing flares interiorly upwardly and downwardly from a ridge or peak 16, near its middle. Rigid with the upper end of the bushing, preferably formed integral therewith is a dust ring 17 having a spherical upper bearing surface 17' centered about the center of gyration 13. Above the ring 17 is a cylindrical member 18, the lower surface of which is spherical and bears directly on the surface 17' of ring 17. The concentric inner and outer cylindrical walls of the member 18 fit closely the concentric cylindrical surfaces formed respectively on the outside of sleeve 14 and the inside of the depending flange 19 which extends downwardly from the outer edge of the annular flange 20 springing from the upper end of the sleeve. As the shaft gyrates the spherical surface of cylindrical member 18 slides over the spherical surface of ring 17 and maintains a dust and dirt tight fit therewith, thus preventing grit from entering the socket and causing excessive wear of the sleeve 14 and bushing 15. Where the hub 11 is submerged in water, or a stream of water runs through the machine, this construction is particularly useful, such water being entirely excluded from the shaft socket.

Having thus described the invention what is claimed as new and desired to secure by Letters Patent is:

1. In a gyratory crushing machine, in combination a frame having a socket, a gyratory shaft having its lower end in said socket forming a step bearing for the shaft, a bushing fitting the wall of the socket and surrounding the gyratory shaft, said bushing having a portion integral therewith above the socket and provided with a spherical bearing surface, and a member movable with the shaft and having a spherical bearing surface slidably engaging the spherical surface of the bushing.

2. In a gyratory crushing machine, in combination, a frame having a socket, a gyratory shaft having its lower end in said socket forming a step bearing for the shaft, a bushing fitting the wall of the socket and surrounding the gyratory shaft, said bushing having a portion integral therewith above the socket and provided with a spherical bearing surface, and a member movable laterally with the shaft and slidable longitudinally thereon having a spherical bearing surface slidably engaging the spherical surface of the bushing.

3. In a gyratory crushing machine, in combination, a frame having a socket, a gyratory shaft having its lower end in said socket forming a step bearing for the shaft, a bushing fitting the wall of the socket and surrounding the gyratory shaft, said bushing having a ring formed integral therewith above the socket and provided with a spherical bearing surface, and a cylindrical member slidably fitting the shaft and having a spherical bearing surface slidably engaging the spherical surface of the bushing.

In testimony whereof I hereunto affix my signature.

WILLIAM S. WESTON.